Figure 1:
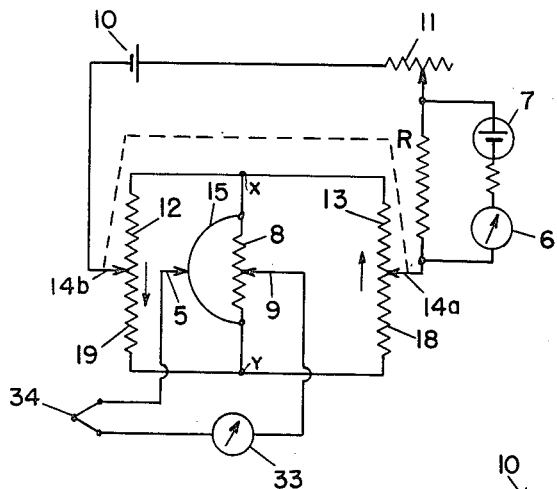

Aug. 7, 1956　　　R. A. McCARRON ET AL　　　2,758,279
POTENTIOMETER MEASURING SYSTEMS
Filed April 26, 1951　　　　　　　　　　　　　　3 Sheets-Sheet 1

INVENTORS.
ROBERT A. McCARRON
CHARLES E. MILLER
BY
Woodcock and Phelan
ATTORNEYS Aug. 7, 1956 R. A. McCARRON ET AL 2,758,279
POTENTIOMETER MEASURING SYSTEMS
Filed April 26, 1951 3 Sheets-Sheet 3

INVENTORS.
ROBERT A. McCARRON
CHARLES E. MILLER
BY
Woodcock and Phelan
ATTORNEYS 200;United States Patent Office 2,758,279
Patented Aug. 7, 1956

2,758,279
POTENTIOMETER MEASURING SYSTEMS

Robert A. McCarron, Willow Grove, and Charles E. Miller, Glenside, Pa., assignors to Leeds and Northrup Company, Philadelphia, Pa., a corporation of Pennsylvania Application April 26, 1951, Serial No. 223,025

11 Claims. (Cl. 324—98)

This invention relates to electrical measuring systems and particularly to potentiometer measuring circuits used in recording and/or controlling the magnitude or changes in magnitude of a condition such as temperature, pressure, weight, speed and the like.

In many measuring situations, it is necessary to measure a parameter of primary importance in the presence of a constant load upon the system, which load is of secondary importance, or to measure such a parameter in a selected portion of its total range of values, with emphasis upon changes rather than total value. Such situations include the following as typical:

(a) Strain gauge measurements of force, as in weighing operations. Large tare weights shift readings to one end of a scale, and live loads frequently bear no integral relation to units of the scale. Further, large tare loads and live loads require a wide-range scale, reducing the effect of smaller changes;

(b) Temperature measurements with thermocouples. Small changes of primary importance occur at elevated temperatures, such as changes through freezing, melting and boiling points, and quenching rates; where actual temperatures are secondary;

(c) Speed measurements using an electrical tachometer. Speed changes in the study of regulation characteristics, governors, etc., often occur over a narrow range, at high total speeds.

In situations such as the above, it has been possible to adjust range and to suppress the zero or reference point; but such adjustments frequently have been accompanied by interactions with change in range requiring re-standardization and readjustment of the whole potentiometer circuit. The resistance presented to the source of current by a potentiometer circuit having continuously adjustable range-control often varies with the setting of this control. This change in resistance requires that the circuit be re-standardized following every adjustment of the range. Also, in some arrangements which minimize resistance changes of the range control circuit, a selected point within the scale range does not remain at a fixed potential with respect to the source of current and to the measuring circuit when the range scale is expanded or contracted, i. e., no point can be located in from the terminals of and along the length of the measuring slidewire of such circuits, which point remains at a fixed reference potential relative to the measuring circuit as the range scale control is expanded or contracted. All points on their range scale are shifted upon changes of range, and no point thereon remains unaffected so as to be useful as a zero or reference point about which known measuring potentials could be developed. Thus, flexibility and ease of adjustment have been limited due to this interaction between range adjustment, zero-suppression adjustment, and the standardizing or calibrating circuit.

In accordance with this invention, there is provided in a potential measuring instrument a range adjustment circuit having substantially no effect upon standardization adjustment of the instrument and not affecting the potential of a fixed reference point in the measuring instrument's circuit.

Further in accordance with this invention, there is provided in a potential measuring system a potentiometer circuit having a range adjustment circuit and an adjustable zero-suppression circuit respectively capable of adjustment with substantially no interaction therebetween and with substantially no effect upon the standardization of the system.

More specifically in accordance with this invention, there is provided a potentiometer system which comprises a network having two parallel branches each in series with the current source and calibrating resistance of the potentiometer. The measuring slidewire is cross-connected between the two branches of the network: specifically, it is connected between points, respectively in the two parallel branches, whose potential difference is variable, as by complementary variable resistors of the network, for selection of different ranges of measurement without changing the current from said source through the calibrating resistance. For selection of different zero shifts or suppressions for said system, the source of voltage to be measured and the unbalance detector are connected between the slidewire and a selected zero-point of potential intermediate or beyond the range of the measuring slidewire. Such potentiometer system has the characteristic that changes of the measuring range are without effect upon a selected zero shift or suppression and that changes of zero-suppression are without effect upon the selected measuring range, and that both adjustments are without effect upon the standardization of the system.

Figure 2:
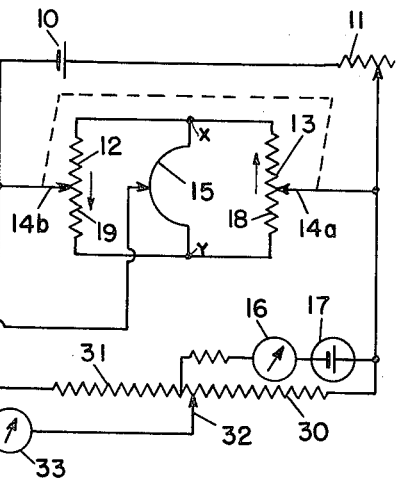
Figure 3:
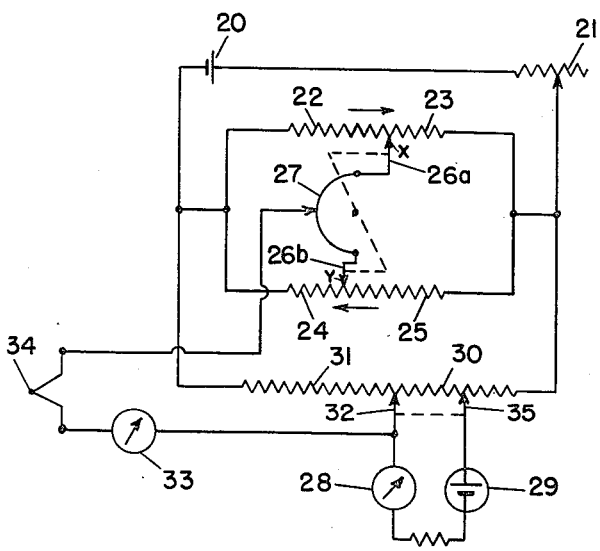
Figure 4:
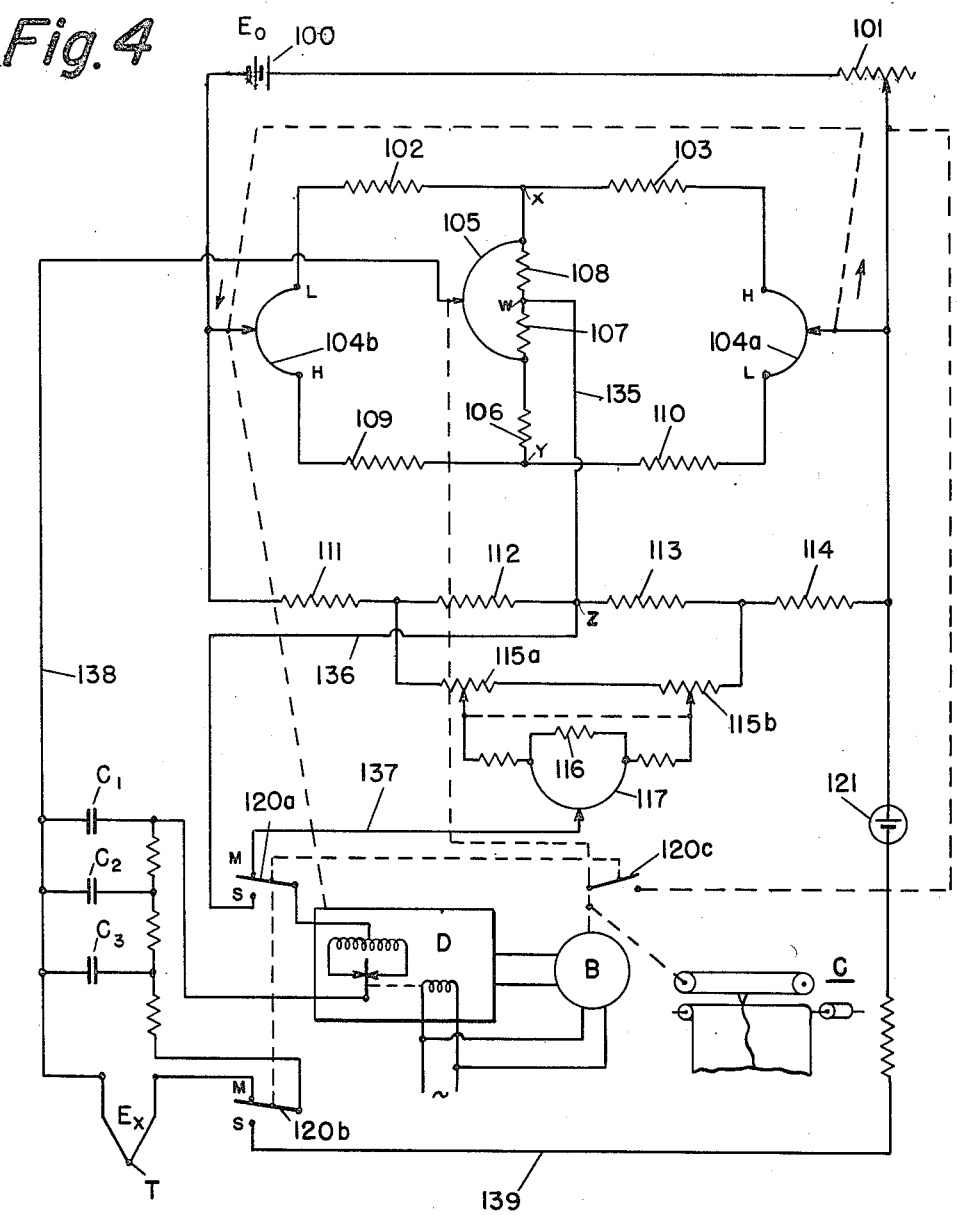
Figure 5:
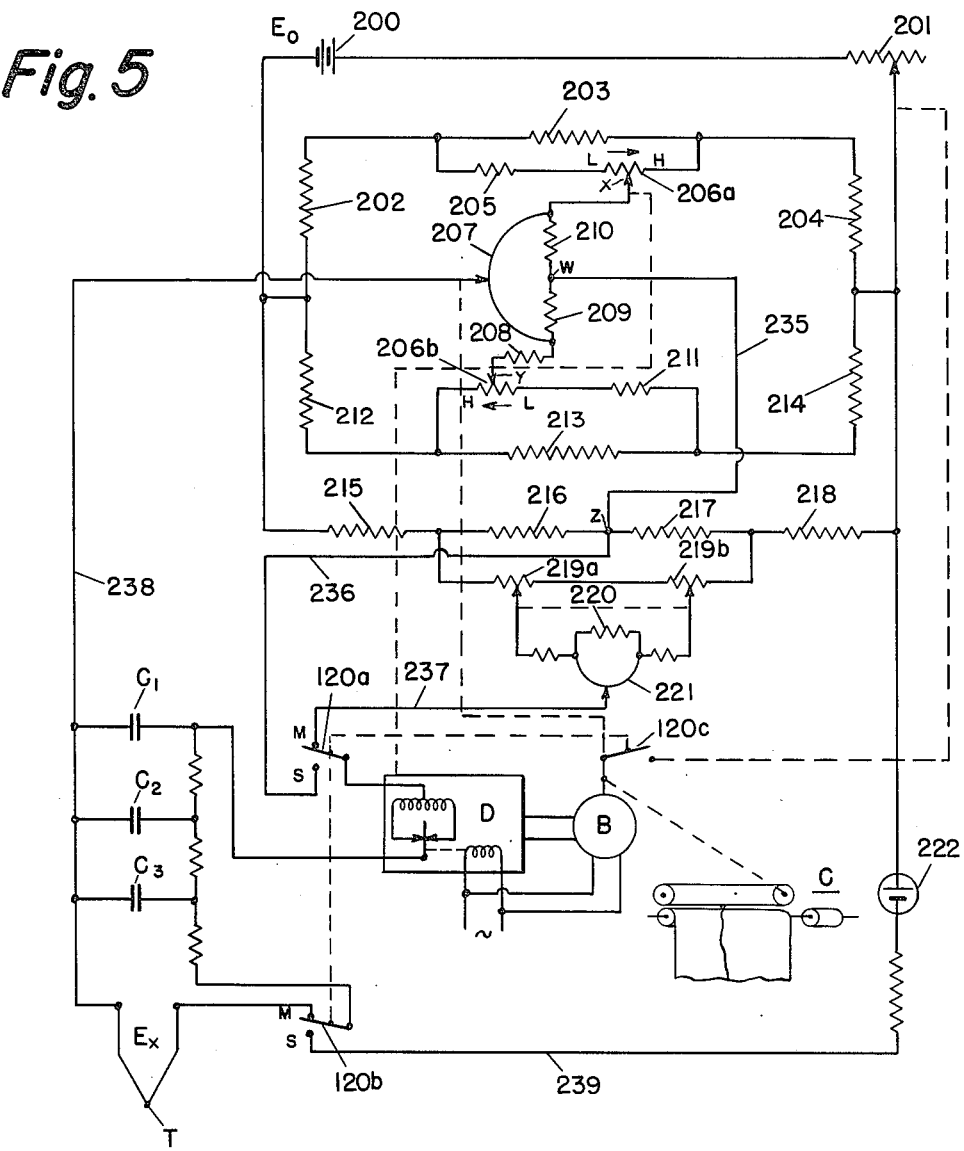
Figure 6:
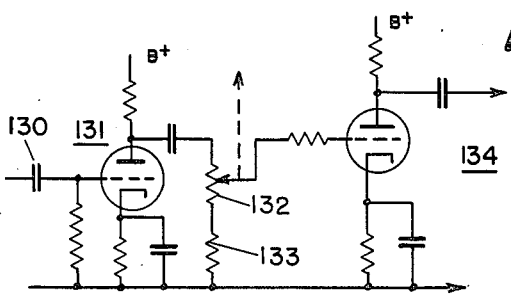

For a more detailed description of this invention, reference is made to the drawings in which:

Fig. 1 schematically illustrates a simplified embodiment of the potentiometer circuit of this invention;

Fig. 2 schematically illustrates another simplified embodiment of the potentiometer circuit of this invention;

Fig. 3 schematically illustrates a further simplified embodiment thereof;

Fig. 4 schematically illustrates the embodiment of Fig. 2 in greater detail;

Fig. 5 schematically illustrates an embodiment similar to that of Fig. 3 in greater detail with the standardizing circuit the same as in Fig. 4; and Fig. 6 schematically illustrates a gain control for the unbalance detectors of preceding figures.

In Fig. 1, illustrative of a simplified embodiment of the potentiometer circuit of this invention, a source of current, such as battery 10, is provided in series with the calibrating rheostat or variable resistor 11 and the potentiometer network. Resistor 11 is adjustable from time to time, either manually or automatically, to keep the total current through the potentiometer substantially constant despite aging of the battery. At least during re-standardization, a standard voltage cell 7 and an indicating detector 6 are shunted across a fixed resistor R. The battery 10 and rheostat 11 provide a standardized current source for the potentiometer network. Resistor R may be a fixed resistor of proper value in some part of the potentiometer circuit which receives the total, or a fixed fraction, of the current through calibrating rheostat 11. When the voltage drop across resistor R is equal to the voltage of the standard cell 7, a null response of detector 6 corresponds with proper current level for standardized condition. A protective resistor may be inserted in series with detector 6 and voltage cell 7 to limit the current drawn from standard cell 7. Detector 6 may, as shown in Letters Patent No. 1,935,732 to Squibb, utilize the cell current developed when non-standard current flows through resistor R as an unbalance signal, driving a balancing system automatically to adjust the standardizing resistor 11.

The potentiometer includes a range-control network having two branches connected in parallel to each other and connected in series with the current source 10 through variable taps 14a and 14b. The two branches consist respectively of serially-connected resistors 12 and 13 in one branch and serially-connected resistors 18 and 19 in another branch. The sum of the respective currents of the two parallel branches traverses the calibrating rheostat 11. As illustrated in Fig. 1, resistors 12 and 19 may be complemental portions of one resistor contacted by a relatively adjustable contact or tap 14b and resistors 13 and 18 may be complemental portions of another resistor contacted by a relatively adjustable contact or tap 14a. The slidable contacts or taps 14a, 14b are coupled for movement in unison, as indicated by the arrows adjacent thereto, to maintain constant the total resistance in each of the two parallel branches of the range-control network for all range settings of the contacts. Thus, for substantially different range settings, the resistance of the network between contacts 14a, 14b remains substantially constant and accordingly the current from source 10 through the calibrating rheostat 11 and resistor R remains substantially constant.

The measuring slidewire 15 of the potentiometer is connected between points X, Y respectively in the upper and lower branches of the range control network and accordingly will have various voltage gradients impressed thereacross as determined by adjustment of the range control taps 14a and 14b. It is this voltage gradient which determines how large an unknown potential can be opposed and equalled by adjustment of the variable tap 5 on measuring slidewide 15. Tap 5 on slidewire 15 is connected to a source of unknown potential to be measured, exemplified by thermocouple 34, and to detector 33 in series therewith. The return lead may connect to either end of slidewire 15, in which case the measuring scale for the slidewire will be from a starting point at zero to the maximum voltage applied to slidewire 15, with polarity determined by the particular connection used. A scale whose zero point may be of any potential intermediate the end potentials of slidewire 15 is afforded by a zero-shifting circuit provided by resistor 8 connected across slidewire 15, with the return lead connected to variable tap 9 thereon. Tap 9 is adjustable to produce, in series with source 34 and slidewire 15, a zero-shift voltage selectively fixed to determine the operating point about which the opposed potentials of source 34 and slidewire 15 are balanced for minimum or zero current in detector 33. For automatic rebalancing adjustment of the slidewire 15, the detector 33 may be a galvanometer, as in Squibb Patent No. 1,935,732 or an amplifier-chopper, as in Williams Patent No. 2,367,746.

Selection of different zero-shift voltages by resetting of tap 9 on resistor 8 does not alter either the potential gradient across the measuring slidewire 15 selected by adjustment of range control taps 14a—14b, or the current to the network as determined by the setting of standardizing resistor 11. At balance of the measuring circuit for any setting of the zero-setting contact 9, the potential of source 34 is substantially equal to and opposed to the potential between contacts 5 and 9, and consequently there is no alteration of the current and voltage relations established by the settings of the range contacts 14a, 14b and the calibrating rheostat 11.

Fig. 2 illustrates another embodiment of the novel potentiometer circuit in a simplified form. As in Fig. 1, a network having two parallel branches is connected in series with the standardizing rheostat 11 and the current source 10. Also, as in Fig. 1, the measuring slidewire 15 is connected between points X, Y of the branches and the voltage gradient across the slidewire is determined by the setting of range contacts 14a and 14b. The voltage gradient across measuring slidewire 15 determines the voltage range available to oppose the unknown potential of source 34; but, whereas in Fig. 1, the zero-shifting potential (the potential of contact 9) must be within the range of potentials of points X, Y, the zero-shifting potential afforded by the arrangement shown in Fig. 2 may be adjusted over a much greater range affording zero-suppression and does not change in value when the range is changed. For that purpose, a lower, single-branch network comprising resistors 30, 31 is connected across the source of standardized current, and provides a voltage, in series with the potential to be measured and with the measuring slidewire potential, variable to shift the operating or zero-point of the measuring system. This zero-shifting voltage is derived from the standardized current source—not from a second, separate source of current: specifically, resistors 30 and 31 are complemental portions of a variable resistor connected to the source of standardized current, and variable connection 32 is movable to contact any potential thereon from a voltage equal to that at the point on measuring slidewire 15 which is unaffected by adjustment of taps 14a—14b, which voltage would provide no shift of the zero or operating point of the system, to a voltage of either polarity substantially greater than the magnitude of the voltage gradient of measuring slidewire 15 for intermediate settings of the range-selector contacts 14a, 14b.

The arrangement of Fig. 2 also differs from that of Fig. 1 in that the voltage of the standard cell is opposed to a fixed fraction of the voltage drop across the two-branch network rather than to a voltage drop across a resistor in series with that network and the source of standardized current. Specifically in Fig. 2, detector 16 and standard cell 17 are connected in series across a fixed fraction of the total resistance of resistors 30, 31. When the current from battery 10 is standardized, by adjustment of calibrating rheostat 11 to obtain the standard voltage drop across the two-branch network including measuring slidewire 15, the voltage drop across said fixed fraction of resistors 30 and 31 of the lower single-branch network 30, 31 will equal the voltage of the standard cell 17, as indicated by null response of detector 16. Upon deviations from this standardized current, detector 16 will indicate polarity and magnitude of this departure. Such indication of detector 16 may serve as a guide for proper manual adjustment of rheostat 11, or can be utilized, as in the aforesaid Squibb and Williams patents, as an unbalance signal which automatically effects re-adjustment of calibrating rheostat 11.

Although the voltage of the source of standardized current is applied to the upper two-branch network and to the lower single-branch network in parallel, the measuring circuit is a series-loop consisting of the source 34 of unknown potential, the detector 33 and the potentiometer network as seen at two points respectively in the upper and lower networks. This circuit can be traced in a single path from the contact of slidewire 15 through thermocouple 34 and detector 33 to variable contact 32, thence in two paths therefrom, one along resistor 30 to tap 14a of the upper network and the other along resistor 31 to tap 14b, of the upper network. In the upper network, these paths converge and meet at the variable tap on slidewire 15.

There is a point in the measuring slidewire 15 whose potential remains the same for all settings of the range contacts 14a, 14b. This point is the mean potential point between X and Y and, for brevity, is called the "reference" point. In the lower single branch 30, 31, there is a point having the potential of the reference point and therefore corresponding with the operating point for a null, zero-shift setting of contact 32. To obtain a desired zero-shift or suppression, the contact 32 is moved from the null, zero-shift setting to obtain the corresponding potential difference between contact 32 and the reference point in slidewire 15. This zero-suppression potential-difference remains the same when the range contacts 14a, 14b are reset to provide different ranges of measurement of the unknown voltage.

For measurement of the output of thermocouples or other sources of small voltage, the maximum value of the voltage across measuring slidewire 15 is a small percentage—such as less than about 2%—of the voltage applied to the upper, two-branch network: in such case the slidewire voltage varies nearly linearly with positions of the range-control contacts 14a and 14b. With such small voltages across measuring slidewire 15, movement of the range-control contacts 14a and 14b affording as much as a 20 to 1 variation of the maximum slidewire voltage causes little variation in the battery current to this upper, two-branch network. Accordingly, a high degree of range control can be effected without the need for re-standardizing the battery current to insure precise measurements: for example, in potentiometer circuits constructed to embody this invention, range-control has been provided which makes the range scale adjustable from —0.1 to +1.0 millivolts as a minimum range, to —2.0 to 20 millivolts as a maximum range, without appreciably affecting the total resistance of the upper network and the standardized current.

By movement of contact 32, the zero-suppression of the measuring system, or the operating point thereof, can be varied over a wide change of suppression voltages. As such selectively fixed voltage is utilized either to add to the unknown potential of thermocouple 34 or to subtract therefrom, so merely to shift the balance point on slidewire 15 for any given value of the unknown voltage, no current flows through the series measuring circuit at balance, and the current drawn by resistors 30 and 31 from the source of standardized current is unaffected by changes in setting of the zero-suppression circuit.

Thus, adjustment of the range-control does not affect a selected zero-suppression, adjustment of zero-suppression is without effect upon the selected measuring range and neither adjustment requires, for precise measurements, a re-standardizing adjustment of rheostat 11 or equivalent.

Fig. 3 illustrates a generically similar potentiometer circuit differing from Fig. 2 in the use of another embodiment of the range-control in the upper, two-branch network, and providing another embodiment of a circuit for detecting the existence of standardized current. Either of these embodiments can be substituted in Fig. 2 independently of the other.

In Fig. 3, various voltage gradients are impressed upon measuring slidewire 27 by movement of range-control contacts 26a and 26b from a center or neutral position, in opposite directions along the resistors of the two-branch network as indicated by arrows. Contact 26a moves along resistors 22 and 23, while contact 26b moves along resistors 24 and 25. In this modification, as in all others, the total resistance of each branch of the two-branch network remains the same for all settings of the range-control contacts. Again, for measurement of small unknown voltages the maximum voltage gradient to be applied to measuring slidewire 27 is small, less than about 2% of the total voltage applied to the upper network, so that the maximum adjustment range required of contacts 26a and 26b need be, for such measurements, only a small portion of the resistors forming the upper, two-branch network. For example, a change in setting from the 0.1–1.0 millivolt range to the 2.0–20.0 millivolt range produces negligible change in the battery current flowing to the two-branch network and there is consequently no need to restandardize despite this 20 to 1 change of range.

The zero-suppression circuit is similar in principle to that of Fig. 2 in that the standard cell voltage is balanced against a fixed fraction of the standardized voltage impressed upon the two-branch network. However, in Fig. 3, a second variable contact 35 is ganged with variable contact 32 and spaced therefrom for movement along the resistors 30 and 31 so to include a constant ohmic resistance therebetween. Detector 28 and standard cell 29 are connected in series between contacts 32 and 35 so that detector 28 will indicate the magnitude and polarity of any difference between the voltage drop across the resistance included between contacts 32 and 35 and the potential of the standard cell 29. At proper standardizing adjustment of rheostat 21, the voltage drop across the resistance between contacts 32 and 35 will equal the potential of standard cell 29 and there is null response of detector 28. Since detectors 28 and 33 have a common connection to contact 32, they may be replaced by a single detector with a switching contact connecting it to the source 34 of unknown potential in the measuring position, and connecting it to standard cell 29 in the standardizing position.

As in Figs. 1 and 2, adjustment of tap 32 to different zero-suppression settings does not disturb the standardized current or the voltage gradient of slidewire 27.

With the range-control producing no change in the standardization of the circuit, nor affecting the zero or reference point of the measuring slidewire; and with the zero-suppression circuit likewise not affecting the standardization of the circuit, freedom from interaction between adjustments is provided.

The modification shown in Fig. 4 is generically similar to those above described. The potentiometer is energized from any suitable source of current, such as battery 100 providing potential $E_0$ in series with standardizing resistor 101. As in Figs. 2 and 3, two circuits are in parallel across the standardized current source; one, the double-branched range-control network including resistors 102 to 110 with the measuring slidewire 105 connected between points X, Y of the branches, and the other a zero-suppression circuit, including resistors 111 to 117, for shifting or selecting the operating or zero-point of the system. The outputs of these two circuits, as may be observed by tracing the measuring loop as was done for Fig. 2, are in a series connection with detector D and with the source of unknown voltage $E_x$. The upper circuit, including resistors 102 to 110, provides a two-branch network of bridge type, with the range-control resistors 104a, 104b forming parts of what would ordinarily be termed the ratio arms of the bridge and with the measuring slidewire 105 in what would ordinarily be termed the "galvanometer arm" of the bridge.

By adjustment of the contacts of range resistors 104a, 104b, the bridge may be unbalanced to desired slight extent to effect flow through the measuring slidewire of current providing the desired voltage drop across the slidewire. Thus, as in preceding figures, the maximum slidewire voltage available for potentiometric measuring purposes may be varied for different ranges of measurement.

In the system shown in Fig. 4, the junction of resistors 107 and 108 is fixed at the electrical center of the bridge i. e., the mean potential between points X and Y, by making opposite resistance arms equal: in accordance with this relationship, resistor 102 equals resistor 110, resistor 103 is equal to resistor 109, and the respective resistances of resistors 105, 106, 107 and 108 are such that the voltage drop between points X and W equals that between points W and Y when there is zero current-flow in lead 135. Point W is thus a reference point whose potential remains the same for all settings of the range contacts of resistors 104a, 104b.

For many measuring uses of the potentiometer, it is desirable that the effective resistance of resistors 105, 106, 107 and 108 be equal to about half of resistor 102; that resistors 104a and 104b be each equal to about 1/20th of resistor 102; and that resistors 103 and 109 be each equal to about 19/20th of resistor 102. With the maximum voltage across the measuring slidewire 105 equal to about 2% of the bridge supply voltage, the slidewire voltage varies substantially linearly with the setting of the range-control resistors 104a and 104b throughout their range of adjustment.

The range-control resistors are ganged to move in unison so that, for example, as resistor 104a is moved towards the "High" position H, the resistor 104b is simultaneously moved to its "High" position H. As indicated in Fig. 4, the range-control resistors 104a, 104b are complementarily adjustable so that the total resistance of each branch of the two-branch network remains the same for all range settings. Maximum voltage is applied across measuring slidewire 105 when the range-control resistors are in position H. Throughout the adjustment of the range-control resistors, the change in battery current through this bridge circuit, with changes in the range-control resistors, is substantially zero and there is no need for re-standardizing the battery current by re-adjustment of standardizing resistor 101 for the full range change provided by resistors 104a and 104b.

In the lower parallel branch circuit including resistors 111 to 117, an output voltage is provided for shift of the zero or operating point of the measuring system; the magnitude of this voltage is controlled by means of the dual variable linear resistors 115a and 115b for coarse or wide adjustment and by resistor 117 for fine or small adjustments. This adjustment of the operating point or the zero-point is frequently referred to as zero-suppression for a measuring system. As in preceding figures, negligible current flows in the measuring loop of unknown potential $E_x$, detector D, and branch networks between resistor 117 and slidewire 105, so the zero-suppression adjustment moves a negligibly light load across resistors 115 and 117. This adjustment does not affect the standardized current through resistor 101. At balance of the unknown voltage, no current flows in that portion of the measuring loop traced from the contact of slidewire 105 through conductor 138, the source of unknown voltage $E_x$, and conductor 137 to the contact of slidewire 117.

The values of resistors 111, 112, 113 and 114 are so chosen that the potential of the mid point Z between resistors 112 and 113 is substantially equal to the potential of the connection point W between resistors 107 and 108 of the upper circuit. Because of this equality of potential, lead 135 interconnecting these points will carry no current at balance, and in the ideal case could be omitted. However, omission of lead 135 requires that unbalance currents produced by a difference in potential between measuring slidewire 105 and the unknown voltage $E_x$ must travel through the various resistors of the upper network, resistors 102 to 110, and return through the various resistors of the lower network, resistors 111 to 117, before reaching the detector D of the measuring system: this circuit introduces a comparatively high impedance in series with the balancing circuit and adversely affects damping thereof. In most arrangements, the measuring system operates best with low impedance in the balancing circuit; hence, lead 135 is used to obtain improved damping during the balancing of the measuring system.

Detector D is provided with a two-way switch 120a—120b in its input circuit, movable from a measuring to a standardizing position. In the measuring position M, a source of unknown voltage $E_x$, such as thermocouple T, is connected in series with measuring slidewire 105, the zero-suppression circuit terminating in resistor 117 and detector D. In the standardizing position S, the thermocouple and the zero-suppression circuit are disconnected by switch 120a and 120b and connection of the detector D is made to the series-loop consisting of resistors 113, 114 and the standard voltage cell 121.

Simultaneously, a mechanical connection 120c is made to the balancing motor B, providing an actuating connection for adjustment of calibrating resistor 101. Adjustment of resistor 101 is in a direction making the potential across resistors 113 and 114 equal and opposed to the potential of the standard cell 121; any difference between these potentials is impressed upon detector D and applied to balancing motor B in the proper polarity to cause the desired adjustment of resistor 101.

While switch 120a, 120b is in the standardizing position, a second series-loop consisting of the upper two-branch network, the measuring slidewire 105, and the damping capacitors $C_1$, $C_2$, and $C_3$ remain across the input to detector D in parallel with the series-loop consisting of resistors 113 and 114 and standard cell 121. However, this second loop was essentially balanced before the transfer to standardizing connection and will produce no more than a momentary transient upon switching. The magnitude of this transient is determined principally by the magnitude of the zero-suppression voltage. A standardizing circuit avoiding this transient is illustrated, in simplified form, in Fig. 3.

In operation, assume that an unknown voltage $E_x$ is applied to the measuring system as illustrated in Fig. 4, and that the switch 120a and 120b is restored to the measuring position M. A source of standardized current, such as battery 100 providing potential $E_0$ in series with resistor 101, provides the desired current through the upper two-branch network and through the lower single-branch network of the potentiometer circuit. Variable resistors 104a and 104b are adjusted to provide the desired voltage gradient across measuring slidewire 105 in accordance with the desired range of measurements. Such adjustment of resistors 104a and 104b accomplishes this change in voltage gradient with substantially no change in the total resistance of the upper, two-branch network as it appears across the source of standardized current. For the low-range setting L of resistors 104a and 104b, the total resistance shunted across the source of standardized current by the upper or two-branch network is substantially equal to resistor 102 (assuming the values for the network resistors bear the above-described relations). When resistors 104a and 104b are at the other extreme of range-control adjustment, i. e., in the position illustrated as H, the total resistance across the source of standardized current, as provided by the upper or two-branch network, is within 0.15% of the value of resistor 102. This small variation in the total shunt resistance of the two-branch network produces substantially zero effect upon the standardized current from battery 100.

The measuring loop circuit from the source of unknown voltage $E_x$ through measuring slidewire 105 continues through resistors 107 and 108, lead 135, resistors 112 and 113, to adjustable resistors 115a and 115b which provide the coarse adjustment for zero-suppression or for shift of the operating point of the measuring system. Fine adjustment resistors 116 and 117 are connected to the variable resistors 115a and 115b, and the measuring circuit continues along lead 137 to switch 120a and thence to detector D, switch 120b, and back to $E_x$. Thus, there is in series across the input to detector D the source of unknown voltage $E_x$, the measuring slidewire 105, and the zero-suppression circuit. If the potentials in this series circuit are not zero, the unbalance signal applied to detector D and thence to balancing motor B is of such polarity as to cause motor B to drive the contact on measuring slidewire 105 toward the selection of a potential thereon equal and opposite to the algebraic sum of the selectedly fixed zero-suppression voltage and of the unknown voltage $E_x$. Motor B also drives chart recorder C to indicate the slidewire potential needed to balance the measuring system. The position of the range-control resistors 104a and 104b determines what amount of change of unknown voltage $E_x$ will shift scale indication from zero to full-scale deflection of the chart recorder C, as determined by the voltage gradient applied across measuring slidewire 105. At balance, current through this measuring circuit is zero; and for most unbalance signals, the current is negligible. Accordingly, it represents little or no load upon the branch networks, so adjustment of the zero-suppression circuit and the measuring slidewire 105 do not affect the standardized current.

It is to be noted that the zero-suppression circuit consisting of resistors 111—117 is a balanced circuit connected across the source of standardized current: i. e., resistor 111 equals resistor 114, resistor 112 equals resistor 113, and variable resistor 115a equals variable resistor 115b. Change in the position of the contacts thereon does not vary the current flowing through resistors 111 to 114, nor does variation of the contact upon resistor 117 affect this current; therefore, the adjustment for zero-suppression can vary from a balanced or zero-voltage position for the operating point, at which its potential is the same as that of point Z and of point W, to several times the maximum range of measuring slidewire 105 in either the plus or the minus direction, without any effect upon, or interaction with, the range-control adjustment, the voltage gradient across measuring slidewire 105, or the adjustment of standardizing resistor 101.

In this potentiometer circuit, it is desirable to have the voltage $E_o$ of battery 100 equal to slightly more than twice the voltage of standard cell 121. With $E_o$ equal to about twice the standard cell potential, the potential on the branch networks, on either side of their center points W, Z connected by lead 135, is approximately equal to the standard cell potential. Specifically, the potential across either resistors 111 and 112 from battery 100 to lead 135, or across resistors 113 and 114 from lead 135 to the adjustable contact of resistor 101, is approximately equal to the potential of standard cell 121 and can be adjusted by means of resistor 101 to exact equality therewith. If $E_o$ were not equal to about two times the standard cell potential, but were made equal to about the standard cell potential, then standardizing connections would have to be across the entire branch network shunting the source of standardized current, for example, from the outside end of resistor 111 to the opposite and outside end of resistor 114. While this connection for standardizing would place the voltage drop across resistors 111 to 114 in opposition to the potential of standard cell 121, which voltage drop can be adjusted to equality with the standard cell potential by adjustment of resistor 101, an additional series-circuit loop would be formed from the junction point of resistors 112 and 113 along lead 135, through resistors 107 and 108 and through measuring slidewire 105, returning on lead 138 through capacitors $C_1$, $C_2$ and $C_3$ to the detector. This second loop would have the voltage drop across resistors 111 and 112 suddenly added to what had been a potential balance, when the switching from measuring to standardizing connection is made. As this voltage is considerably greater than the voltages normally actuating detector D and balancing motor B, a severe transient would be introduced and appear as an undesired break in the record. Accordingly, it is more desirable to make $E_o$ slightly greater than twice the standard cell potential so that, as shown, a standardizing loop can be provided which does not result in large transients upon switching of detector D between its measuring and re-standardizing connections.

Fig. 5 illustrates a further embodiment of the potentiometer circuit utilizing another two-branch network as the upper network. In this circuit, resistors 202, 204, 212 and 214 are fixed and equal. Resistor 203 is equal to resistor 213, and each is equal to about one-tenth of resistor 202. Resistors 205, 206a, 206b and 211 are respectively nearly equal and each also nearly equal to about half of resistor 202. Resistors 208, 209 and 210 total about half of resistor 202, with the effective resistance of resistor 210 equal to the sum of the effective resistance of resistors 208 and 209 with slidewire 207 connected as illustrated. With this configuration, range-control 206 will have a desirable non-linear characteristic, spreading the low end of the range-control scale. Again, the variation in total resistance from low position L to high position H is but a fraction of one per cent—about 0.15%. This negligible variation in load resistance obviates any need for re-standardizing, with full adjustment of range.

The upper or two-branch network of Fig. 5 is connected across a source of standardized current consisting of battery 200 and standardizing resistor 201, and across a lower or single-branch network for zero-suppression adjustment, which circuits are essentially the same as corresponding circuits of Fig. 4. Resistors 215—221 are connected across the source of standardized current as illustrated in Fig. 5, with resistors 219a and 219b of equal magnitude and having variable taps thereon moving in a ganged relation whereby the current drawn by the lower, single-branch network through resistor 201 remains unaffected by movement of the variable taps upon resistors 219a and 219b. Resistor 221 shunted by fixed resistor 220 provides for a variable connection between these moving contacts for further, fine adjustment of zero-suppression for the measuring system. Further, the loading of the measuring circuit connected to the variable tap on resistor 221 is negligibly light on the adjustment networks. This is due to the balancing action of the measurement, drawing little or no current. Hence, full adjustment of zero-suppression is without effect upon the standardized current.

The point of connection W between resistors 209 and 210 is at a point of fixed mean potential relative to the points of connection to the source of standardized current for the branch networks. Also, the point of connection Z between resistors 216 and 217 of the lower network is at the same potential. Accordingly, lead 235 does not affect the range-control and the zero-suppression adjustment circuits of the system, but serves as a low impedance tie-line between the upper and the lower networks. Provision of this tie-line 235 is desirable so that unbalance signals developed due to inequality between the potential selected from measuring slidewire 207, the zero-suppression voltage, and the unknown potential $E_x$ have a comparatively low-impedance path. If lead 235 were omitted, the unbalance signal would have to flow through the network of the upper, two-branch network, i. e., through resistor 207 and outwardly through resistors 206a and 206b, and along both branches of the upper network to the outer connection to resistors 215 and 218 of the lower network, and then through the circuit to lead 237. While this second path for the unbalance signals is usable, in that the system will function through that circuit path, undesirably high impedance is introduced in series with the balancing circuit through such paths, and such higher impedance affects the damping of the balancing circuit, increasing the possibility of oscillation therein. For this reason, lead 235 is included.

Operation of the embodiment of Fig. 5 is essentially the same as for Fig. 4 except that range adjustment is upon resistors 206a and 206b, and zero-suppression is upon resistors 219a, 219b and 221.

For standardization of the circuit of Fig. 5 switch 120a is swung from measuring position M to standardizing position S and the mechanical coupling 120c is closed between balancing motor B and the standardizing rheostat 201. For this switch position, the thermocouple T and the zero-suppression circuit are disconnected from the detector D which is transferred into the series-loop including resistors 217, 218 and standard cell 222. Unbalance signals will be produced at the input to detector D if the voltage drop across resistors 217 and 218 is not equal to the potential of the standard cell 222. This unbalance signal is amplified and applied to balancing motor B in proper phase to cause its rotation for adjustment of resistor 201 in a direction to adjust the voltage drop across resistors 217 and 218 to equality with the output voltage of standard cell 222.

With the switch 120a, 120b in standardizing position, a second series-loop is also connected across the input to detector D; this loop includes the upper and lower-branch networks, the measuring slidewire 207, and the damping capacitors $C_1$, $C_2$ and $C_3$. However, since the voltage upon condensers $C_1$, $C_2$ and $C_3$ was substantially equal to the voltage selected from measuring slidewire 207 plus the zero-suppression voltage, little disturbance to detector D and the balancing motor B will be introduced upon the movement of switches 120a and 120b from the measuring position M to the standardizing position S, and the signal applied to detector D will represent the unbalance between the voltage drop across resistors 217 and 218 as compared to the potential of standard cell 222. If it is desired to eliminate this momentary disturbance or transient, the standardizing circuit illustrated in simplified form in Fig. 3 can be utilized with appropriate circuit connections.

For high speed of response, the detector D includes, as in Williams Patent No. 2,367,746, a high-gain amplifier. As the range is increased in either the embodiment of Fig. 4 or the embodiment of Fig. 5, a point may be reached beyond which the gain of such high-gain amplifier must be reduced to preserve stability of the balancing action in the system. In other words, as the voltage gradient across measuring slidewire 105 or measuring slidewire 207 is increased by adjustment of the range-control, a given motion of balancing motor B driving the measuring slidewire contacts will produce an increasingly large voltage change in the balancing system and reduction of the amplifier gain may be necessary to prevent overshooting or hunting.

In avoidance of such instability, the range-control resistors may be mechanically ganged to the gain-control of the amplifier which is provided in Fig. 6 by the resistors 132, 133. In the particular arrangement shown in Fig. 6, the input signal of detector D is applied through coupling capacitor 130 to amplifier stage 131, which in turn applies an amplified signal to a voltage divider consisting of aforesaid resistors 132 and 133. The variable tap upon, or movable contact of, resistor 132 is mechanically coupled to the actuating means of range-control resistors 104a and 104b of Fig. 4 or of range-control resistors 206a and 206b of Fig. 5. Thus, concurrently with change of the measuring range, there is effected a change in gain of the amplifier. The fixed gain-control resistor 133 is of value providing suitable gain for the maximum range-control setting and resistor 132 is of value affording suitably higher amplifier gain for the minimum range-control setting.

What is claimed is:

1. A multi-range system for potentiometrically measuring a voltage of unknown magnitude comprising a source of supply current, an adjustable calibrating resistance, a range-control network having two branches connected in parallel to each other and in series with said source and said calibrating resistance, each branch of said network having a total value of resistance which is the same for the different measuring ranges of said system, a cross-connection between two points respectively in said two parallel branches, said cross-connection including resistance means defining a reference point of the same fixed potential for the different measuring ranges of said system, a measuring slidewire of fixed resistance included in said cross-connection and having a relatively adjustable contact, said two-branch network including complementarily adjustable resistance means to vary the potentials of said two points of the branches for selection of said different measuring ranges, a branch circuit in series with said source and said calibrating resistance and in shunt to said two-branch network, said branch circuit including second resistance means defining a reference point of the same fixed potential as said reference point in the cross-connection of said two-branch network, a measuring loop including in series between said slidewire contact and said reference point in said branch circuit the source of said unknown voltage and an unbalance detector, and means for introducing into said loop a zero-suppression voltage in series with said source of unknown voltage and said unbalance detector comprising third resistance means included in said branch circuit and having relatively adjustable contact structure operable independently of said complementarily adjustable resistance means of said two-branch network.

2. A system as in claim 1 in which said reference point in the two-branch network is directly connected to said reference point in the branch circuit continuously to provide a low impedance connection between said points for unbalance current of the measuring loop.

3. A system as in claim 1 in which said unbalance detector includes an amplifier having a gain-control, and in which means is provided to couple said gain-control to said complementarily adjustable resistance means concurrently to reduce the amplifier gain as the range of measurement is increased.

4. A system as in claim 1, in which the said means for introducing the zero-suppression voltage into said measuring loop is a plurality of variable resistors connected between fixed points in said branch circuit for coarse and fine selection of zero-suppression.

5. A system as in claim 1, in which a standard cell is connected between variable taps on said branch circuit for balancing by adjustment of the calibrating resistance of the cell voltage against the voltage drop between said variable taps, said taps having a constant ohmic portion of said branch circuit therebetween.

6. A system as in claim 1, in which said resistance means adjustable to vary the potential of said two points of said two-branch network is a plurality of resistors in each of said two branches, proportioned in ohmic values and connected to provide a non-linear adjustment of range at the low end thereof.

7. A system as in claim 1, in which said adjustable resistance means of the two-branch network comprises a pair of adjustable resistors having contacts respectively connected to opposite terminals of said supply source.

8. A system as in claim 1, in which said adjustable resistance means of the two-branch network comprises a pair of adjustable resistors respectively included in the two branches of the two-branch network and whose contacts provide the potential points between which the measuring slidewire is connected.

9. In a measuring system having a potentiometer circuit and a standardized current source therefor, system adjustment circuits comprising a range-adjustment network having two branches connected in parallel to each other and in series with said current source, a measuring slidewire of fixed resistance connected between two points respectively in each of said two parallel branches, resistance means in said two branches of the range-adjustment network and adjustable to vary the potentials of said points to apply a variable voltage gradient to said measuring slidewire while maintaining a fixed point in the slidewire circuit at a reference potential, a single-branch, zero-shifting network connected in parallel to said two-branch network and having resistance means drawing current from said current source to develop a voltage gradient across said single-branch network which includes the reference potential at an intermediate point of said single-branch network, variable contacts respectively on said measuring slidewire and on said resistance means of the single-branch network, and a measuring loop path between said variable contacts including a source of voltage to be measured and a detector responsive to the unbalance between said voltage and the potential difference of said contacts.

10. A multi-range system for potentiometrically measuring a voltage of unknown magnitude comprising a source of standardized current, a network having two branches connected in parallel to each other and in series with said source, each branch of said two-branch network having a total value of resistance which is the same for the different measuring ranges, a measuring slidewire of fixed resistance connected between points respectively in said two parallel branches and having a relatively adjustable contact, said network including resistance means complementarily adjustable to vary the potential difference between said points and across said slidewire for selection of different ranges of measurement without restandardization of said source, fixed resistance means connected across said source and traversed by current from said source to define a potential range including a potential fixed with respect to the mean potential of said points of the two-branch network, and having a relatively adjustable contact for selection of different zero-settings without appreciably affecting the current from said source or the potential difference between said points, and means for connecting said source of unknown voltage and an unbalance detector in series between said adjustable contacts for balance by adjustment of said slidewire contact for variations of said unknown voltage within a range defined by the selected settings of said complementarily adjustable resistances and of the contact of said fixed resistance means.

11. A system as in claim 10 in which said last-named resistance means is in shunt to each of said branches of said two-branch network in order that said potential range shall at least in part be beyond the measuring range of said slidewire for selection of zero settings affording zero suppression unaffected by selection of different ranges of measurement.

References Cited in the file of this patent

UNITED STATES PATENTS

| | | |
|---|---|---|
| 2,217,639 | Luhrs | Oct. 8, 1940 |
| 2,246,575 | Coleman | June 24, 1941 |
| 2,277,365 | Michael | Mar. 24, 1942 |
| 2,389,939 | Sparrow | Nov. 27, 1945 |
| 2,653,299 | Ginzton | Sept. 22, 1953 |

FOREIGN PATENTS

| | | |
|---|---|---|
| 225,922 | Switzerland | Feb. 28, 1943 |
| 880,055 | France | Mar. 12, 1943 |